Oct. 9, 1934.   H. A. ROSE   1,976,581
ELECTRICAL DISTRIBUTION SYSTEM
Filed Dec. 21, 1932
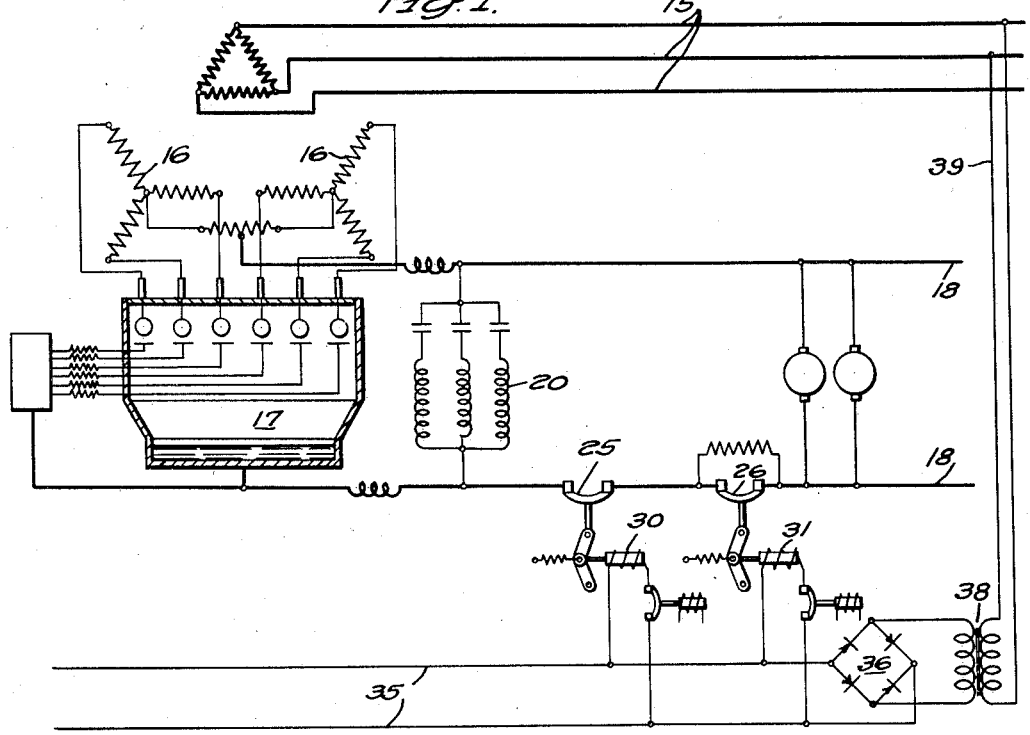
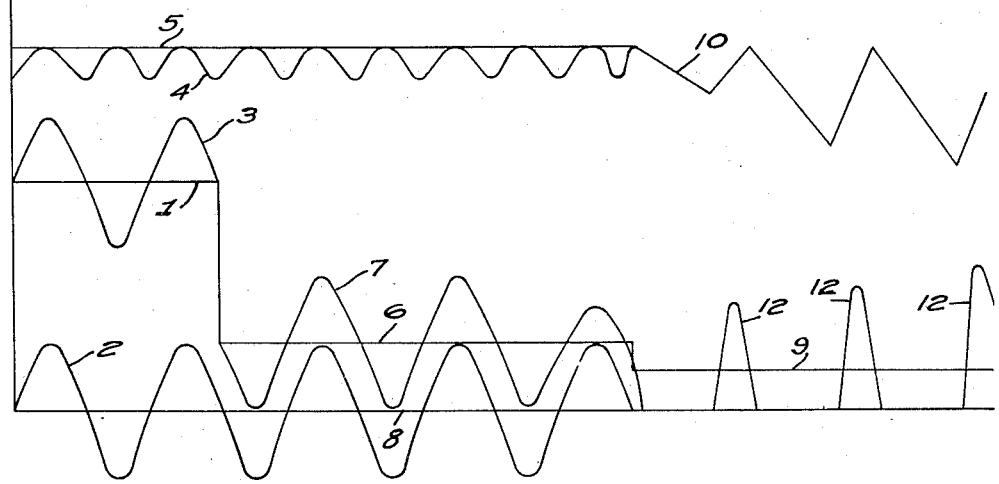
WITNESSES:
E. A. McCloskey.
S. A. Stricklett
INVENTOR
Herbert A. Rose.
BY O. B. Buchanan
ATTORNEY Patented Oct. 9, 1934

1,976,581

UNITED STATES PATENT OFFICE 1,976,581

ELECTRICAL DISTRIBUTION SYSTEM

Herbert A. Rose, Pittsburgh, Pa., assignor to Westinghouse Electric & Manufacturing Company, East Pittsburgh, Pa., a corporation of Pennsylvania Application December 21, 1932, Serial No. 648,205

10 Claims. (Cl. 175—363)

My invention relates to an electrical distributing system, and particularly to a system embodying a vapor-electric device for transforming current.

In the operation of distribution systems utilizing mercury vapor devices, the vapor-electric devices in addition to converting alternating current to direct current or vice versa also act as harmonic generators and impress harmonic voltages on the systems. As these harmonic voltages may cause serious disturbances, it is customary to provide suitable filter equipment for minimizing the harmonic voltages which would otherwise be impressed on the system. These are usually connected to the direct circuit system and consist of a plurality of impedance devices tuned to certain definite frequencies. In the preferred form, the filter equipment consists of a reactor in series with the load bus and a set of tuned shunt elements connected across the circuit to be filtered. The tuned shunt elements, in the preferred form, each consist of a reactor connected in series with a suitable capacitor. The reactive and capacitive impedances of each element are so proportioned that the element as a whole is preferably tuned to the particular harmonic frequency involved. It is usual practice to provide a plurality of these tuned shunt elements because a number of harmonic voltages are usually troublesome and must be either reduced, or in certain cases practically eliminated. By making the reactive and capacitive impedance equal, the shunt filter element is tuned and acts as essentially a short circuit or a circuit of low impedance to the particular frequency involved. As connected, this arrangement minimizes the harmonic voltage applied to the system by causing the generated harmonic voltages to be absorbed in the series reactance or any impedances in the circuit. In certain cases the inherent reactance of the circuit is sufficient for a balanced economic design and in these cases a separate series impedance is not required.

The current taken by the shunt filter elements under normal operation is determined by the voltages of the harmonic generator circuits and the impedance of those circuits together with the impedance of the shunt filter itself. When the load on the rectifying system is approximately equal to or greater than this circuit, the operation of the filter system is normal. However, when the load is less than a certain critical amount, substantially equal to the normal current of the filter system, the operation of the filter and rectifying systems is completely changed and a condition of unstable operation ensues.

This condition of instability comes about through the fact that the load current is insufficient to maintain normal operation of the filter. When this condition obtains the rectifying apparatus supplies current tending to charge the capacitors of the shunt filters to a voltage substantially equal to the peak of the direct-current ripple voltage, in addition to supplying the load current. The ripple voltage of the rectifier rises and falls at harmonic voltage frequency. It follows that with the capacitors charged to the peak ripple voltage any lowering of the rectifier voltage will result in the capacitors tending to supply the direct-current load and the current from the rectifier to fall to zero. This results in extinguishment of the cathode spot or rectifying arc in the rectifier. When this condition obtains it is necessary that the load voltage fall below the rectifier voltage by a certain amount which I prefer to call the re-ignition characteristic of the particular rectifier. In certain cases and conditions the load voltage as determined by the discharging condensers must fall to as much as 20% to 50% or more before re-ignition takes place. In actual operation it has been found that this condition of instability of extinction and re-ignition occurs with varying frequency and amounts of voltage fluctuation.

It has heretofore been the practice to connect certain voltage sensitive electrical control devices such as the holding coils of the circuit breaker to the load bus. These devices upon being subject to this condition function to cause faulty or false operation resulting in shut down of the station and interruption of service.

This is particularly objectionable in such systems as railway networks where power may be fed into non-regenerative sections of load and where every precaution must be taken to prevent a service interruption.

In order to overcome this difficulty, my invention provides for supplying the voltage sensitive devices from an auxiliary direct current source and so arranging and interlocking the control circuits that normal or stable operation is assured.

When, in addition to the voltage fluctuation caused by harmonic filters, the rectifying devices are supplied with such devices as grids by which the load voltage may be reduced or otherwise manipulated, it is particularly desirable to supply the control device with a contact voltage independent of the direct current voltage, but it is desirable in this case that the control voltage be supplied from the alternating current circuit or that failure of the alternating current voltage will automatically disconnect the conversion system.

Other objects and advantages of my invention will be apparent from the following detailed description taken in conjunction with the accompanying drawing, in which Figure 1 is a diagrammatic view of a system embodying my invention, and Fig. 2 is a curve showing the relation of current and voltage output of the rectifier.

At normal loads the load current 1 is greater than the critical load of the rectifier and the filters take a harmonic alternating current 2 of definite value. Both of these currents are furnished by the rectifier so that the rectifier furnishes a pulsating current 3. Under normal conditions the filter system alternately receives and gives back energy to the system according to the ripple voltage 4. The direct current crest values 5 of the ripple voltage 4 remains substantially constant.

If the system load should be reduced to a value 6 such that the rectifier current 7 is periodically reduced to a critically small amount 8, the arc in the rectifier will be maintained together with voltage 5. This is the critical load for the rectifier system.

If the load is then decreased to a lesser value 9 the rectifier current periodically falls to zero and as the rectifier current cannot normally reverse, the arc goes out, extinguishing the cathode spot. With the arc out, the filter system gives up its energy to the load and the system voltage decreases as shown at 10. The voltage continues to drop to the reignition voltage of the rectifier at which value the arc reestablishes or restrikes and the rectifier supplies a pulse of current 12 to charge the capacitors of the filter system as well as supply the direct current load 9. However, as the filter system is recharged the arc again goes out. This condition periodically recurs so that the system voltage fluctuates badly.

Any apparatus connected to the line will thus be subjected to this fluctuating voltage and voltage-sensitive devices such as the holding coils 30—31 of breakers 25—26 may be sufficiently deenergized so that the breakers may "fall out" and interrupt service on the system.

The system, according to my invention, comprises an alternating-current feeding system 15 which is connected by suitable transformers 16 to a rectifier 17 for supplying direct current to a load system 18. Connected in parallel with the rectifier 17 is a filter system 20 for removing harmonics from the load circuit 18. Suitable direct-current breakers 25—26 are provided between the rectifier and the load circuit for disconnecting the load circuit from the rectifier upon the occurrence of certain predetermined load conditions.

The holding coils 30—31 of these direct-current breakers, which have heretofore been connected across the load circuit 18, are connected across a control bus 35 energized from an auxiliary source such as a copper-oxide rectifier. This auxiliary rectifier is separately fed through a transformer 38 from the alternating-current supply circuit 15. In this manner, the control voltage across the holding coils 30—31 of the direct-current breakers 25—26 is independent of voltage fluctuations in the load circuit. Consequently, if the rectifying arc should be momentarily extinguished, causing a fall in load-circuit voltage, the breakers will be held closed and the system maintained ready for service.

The supply line 37 for the transformer 38 being connected to the main supply circuit 15 serves as an electrical interlock between the distribution system and the auxiliary bus 35 so that a failure of the supply voltage operates the control devices to take the system out of service.

While I have shown and described a specific embodiment of my invention, it is apparent that many modifications thereof are possible. I desire, therefore, that only such limitations shall be imposed as are embodied in the accompanying claims or as may be necessitated by the prior art.

I claim as my invention:

1. An electrical distribution system comprising an alternating current supply circuit, a direct current load circuit, a mercury arc rectifier connecting the circuits, a filter system for said system, said filter having sufficient current capacity to extinguish the rectifying arc at low loads, a circuit interrupter in said direct current circuit operable on failure of direct current voltage to disconnect said direct current circuit from said rectifier, and auxiliary rectifying means connected to said alternating current circuit for supplying current to said interrupter.

2. A rectifier system comprising a vapor electric rectifier, an alternating current supply system connected to said rectifier, a variable load direct current load system connected to said rectifier, a tuned filter in shunt with said rectifier, the current capacity of said filter being at least equal to the light load currents required by the direct current load line, a direct current breaker in the load line, a holding coil for holding the breaker closed and an auxiliary source of direct current dependent on the voltage of the alternating current supply system for said holding coil.

3. A rectifier system comprising a mercury arc rectifier, a polyphase alternating current supply for said rectifier, a direct current load circuit fed by said rectifier, an interference filter in shunt with said rectifier, said filter having sufficient capacity to extinguish the rectifying arc at low direct current loads, a direct current breaker in the load circuit, a holding coil for said breaker and an auxiliary rectifier connected to said alternating current supply for supplying current to said holding circuit.

4. An electrical distribution system comprising a source of alternating current, a direct current circuit, a variable load connected to said circuit, a vapor-electric device for supplying current to said direct current circuit, an interference eliminator connected to said circuit, said eliminator having a current capacity sufficiently large to extinguish the rectifying arc in the rectifier at low loads, circuit breakers in said circuit sensitive to a variation in potential and a source of potential for said breakers supplied from said alternating current source independent of said vapor electric device.

5. An electrical distribution circuit comprising a source of alternating current, a vapor electric rectifier, a direct current circuit fed thereby, a variable load connected to said circuit, a filter connected to said circuit, said filter operating at low load to interrupt the current in the rectifier, control devices connected to said circuit, said control devices being sensitive to voltage variations, and a source of direct current for said devices supplied from said source of alternating current independent of the vapor electric rectifier.

6. An electrical distribution circuit comprising a supply circuit, a vapor electric device, a load circuit fed thereby, a variable load connected to said circuit, a filter connected to said circuit, said filter operating at low load to interrupt the current in the vapor electric devices, control devices connected to said circuit, said control devices being sensitive to potential variations, and an auxiliary rectifier responsive to the voltage of the supply circuit for supplying potential for said control devices.

7. An electrical distribution system comprising an alternating current supply circuit, a direct current load circuit, a variable load connected to said load circuit, a vapor-electric device for transferring energy between said circuits, an interference eliminator associated with said rectifier, said eliminator causing voltage variations in the load circuit at low loads thereon, control devices connected to said load circuit, said devices having elements sensitive to voltage variations, an auxiliary control circuit for supplying voltage to said elements and means for supplying said auxiliary system from the alternating current circuit.

8. An electrical distribution system comprising an alternating current circuit, a direct current circuit, a variable load connected to said system, a vapor-electric rectifier for transferring energy between said circuits, an interference eliminator associated with said rectifier, said eliminator causing voltage variations in the load circuit at low loads thereon, control devices connected to said load circuit, said devices having elements sensitive to voltage variations, an auxiliary circuit connected to said control devices and means responsive to the voltage of the alternating current circuit for supplying voltage to the auxiliary circuit.

9. An electrical system comprising a source of alternating current, a direct current load circuit, a variable load supplied from said load circuit, vapor-electric means for transferring current from said source to said load circuit, an impedance connected to said load circuit for reducing the undesirable currents therein, said impedance having sufficient current capacity for causing variations in the voltage of the load circuit at low values of the connected load, devices in said load circuit sensitive to variations in voltage, an auxiliary circuit connected to said devices and means independent of the load circuit and dependent on the voltage of the alternating current source for supplying the voltage applied to said devices.

10. An electrical distribution system comprising an alternating current circuit, a direct current circuit, a vapor electric rectifier for transferring power from one circuit to the other, an impedance device connected to one of said circuits for reducing currents of undesirable frequency in said system, said impedance device having sufficient current capacity to extinguish the current carrying arc in the rectifier and vary the load voltage, control devices in said system sensitive to variation of load voltage, and means independent of the vapor electric device for supplying voltage to said control devices from the alternating current circuit.

HERBERT A. ROSE.